C. B. GRAY.
MACHINE FOR CUTTING SHEET FORM MATERIAL.
APPLICATION FILED OCT. 9, 1918. RENEWED JUNE 7, 1921.
1,384,696.
Patented July 12, 1921.
9 SHEETS—SHEET 3.
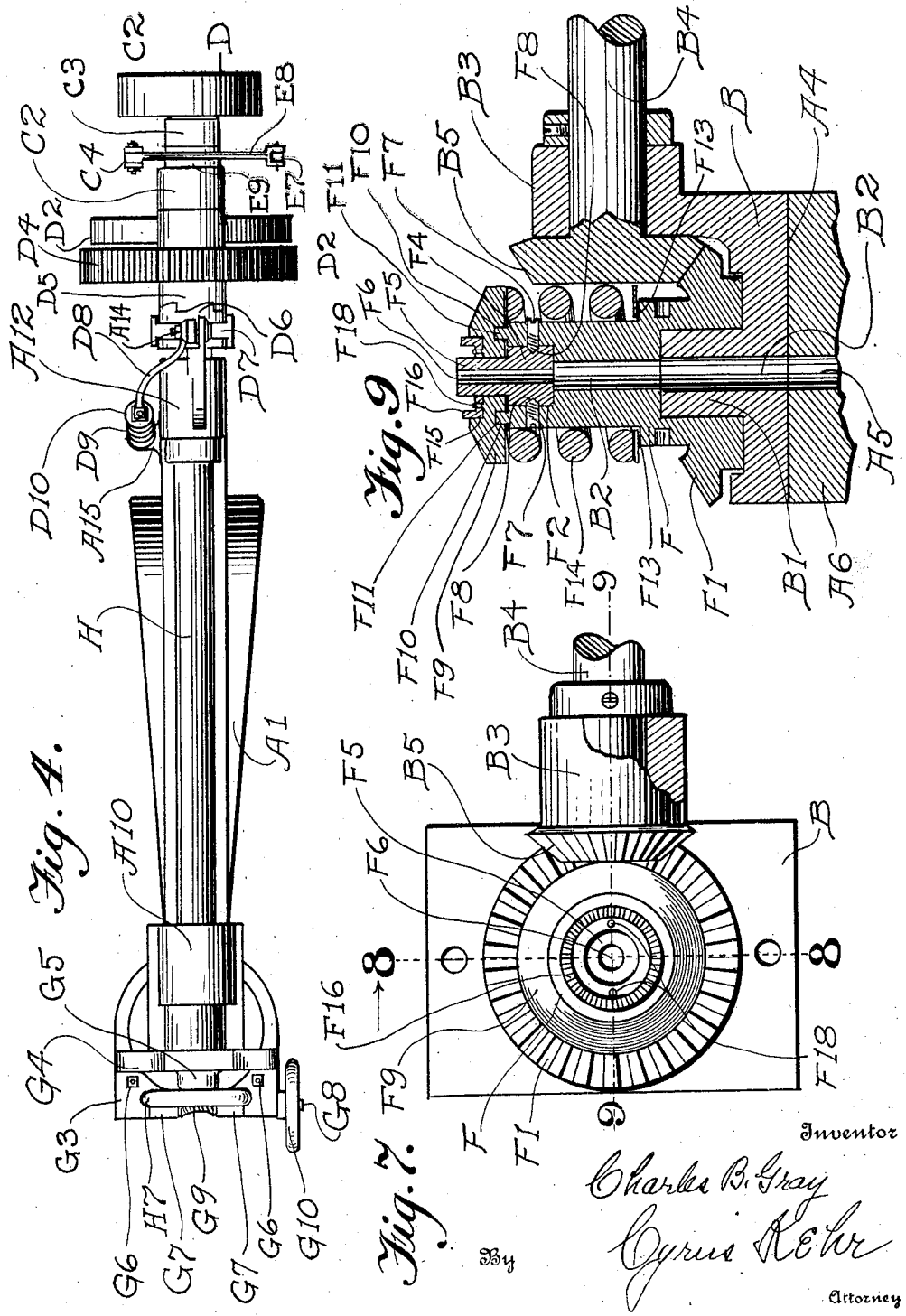

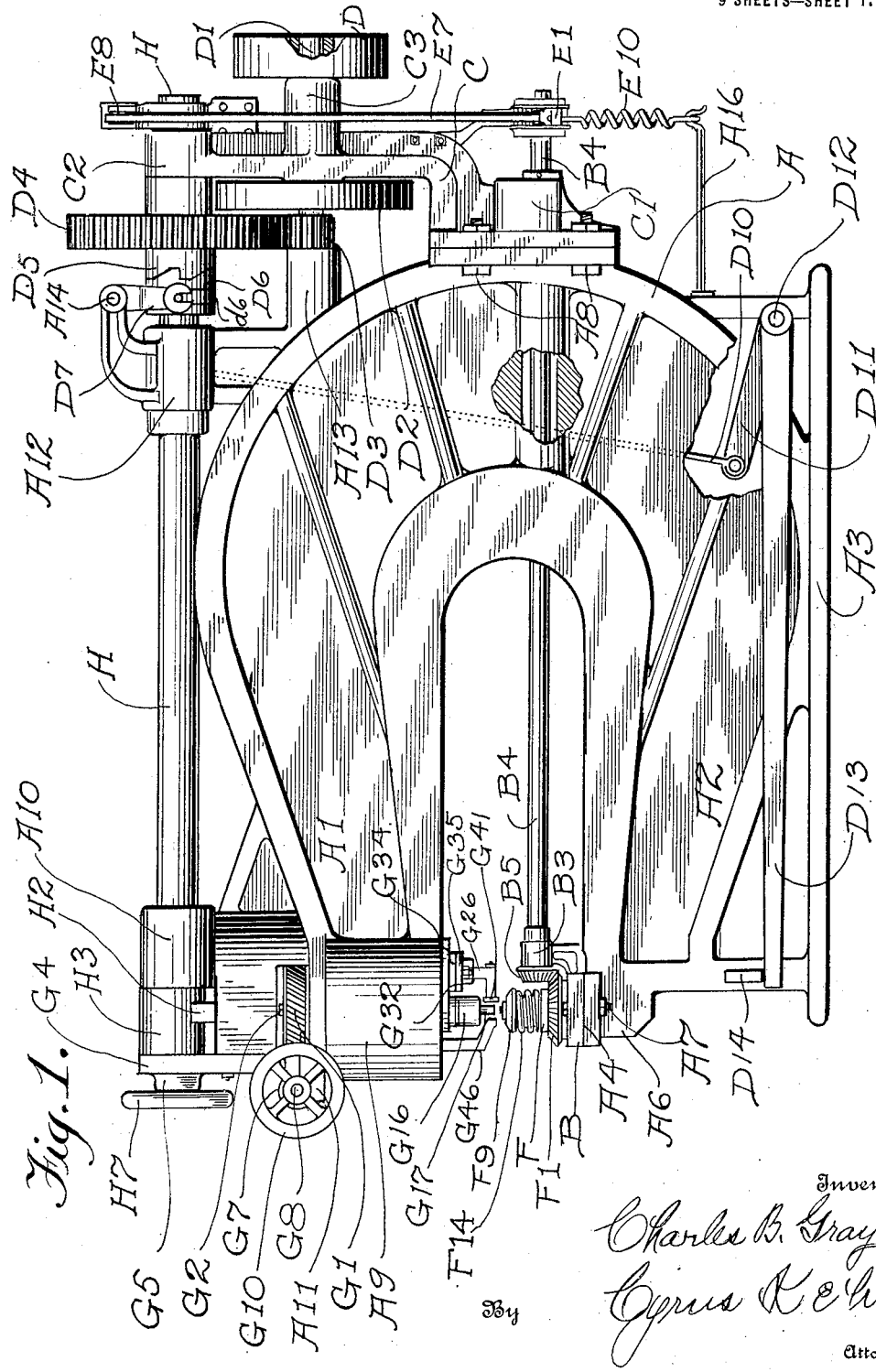

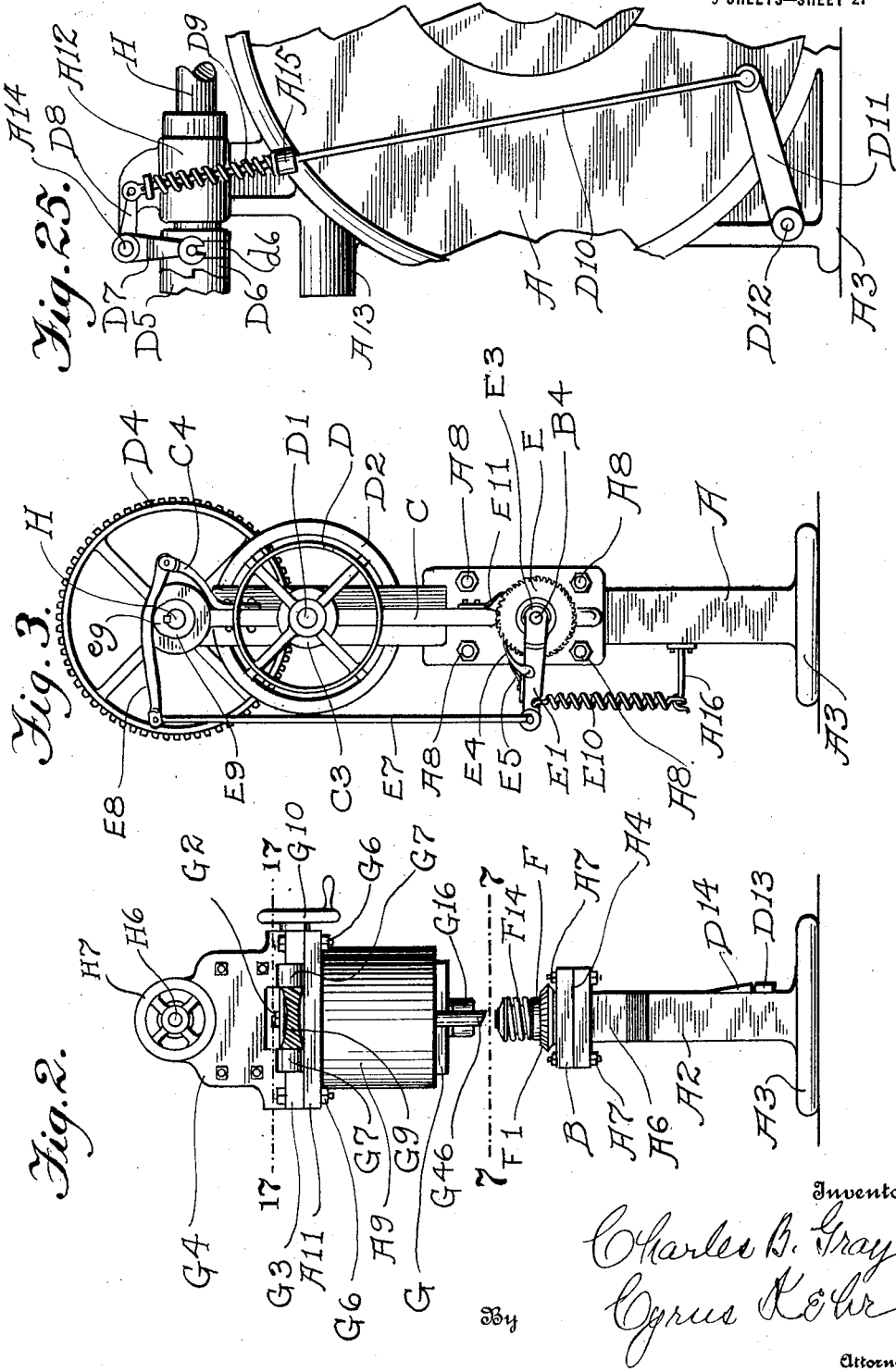

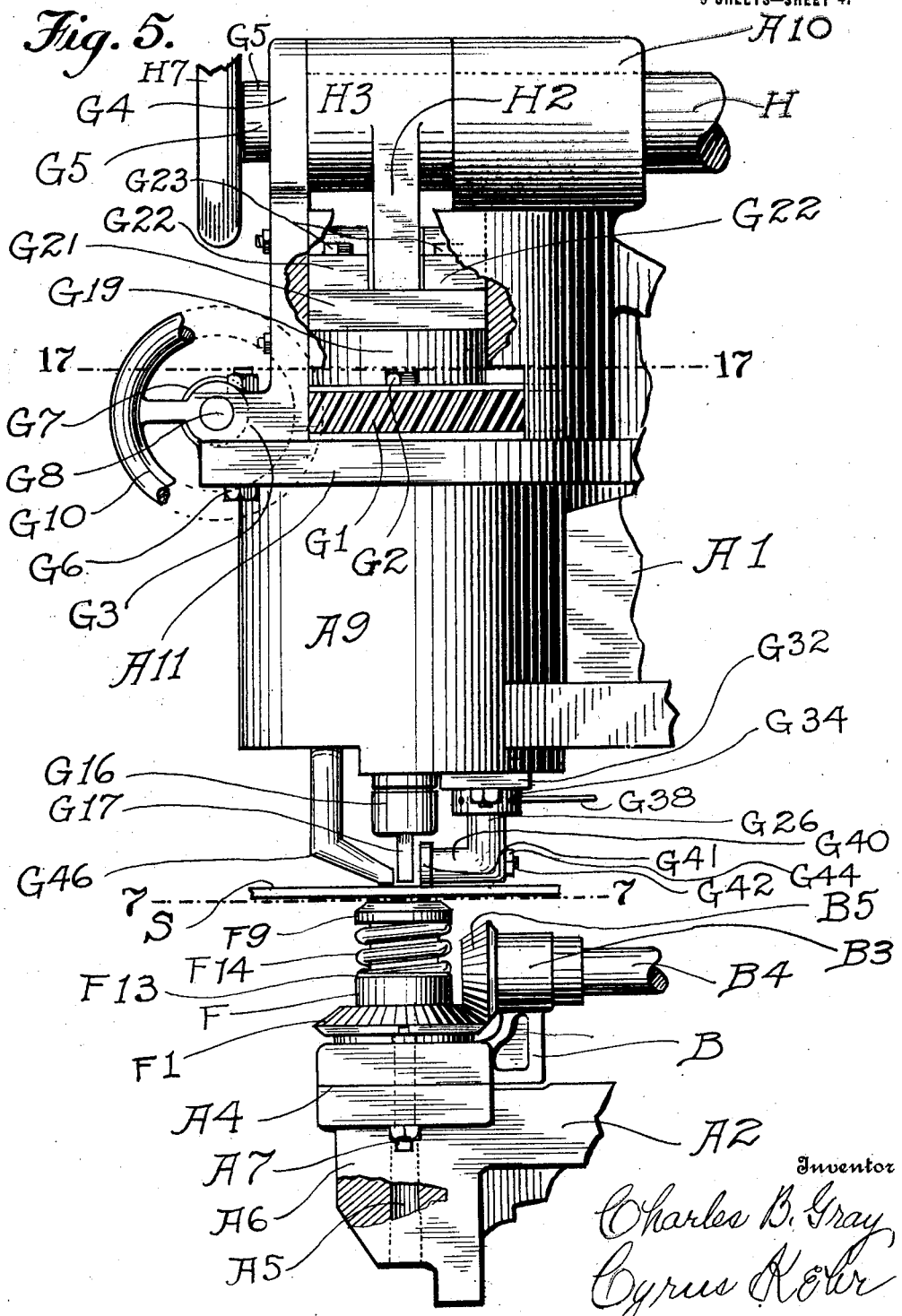

C. B. GRAY.
MACHINE FOR CUTTING SHEET FORM MATERIAL.
APPLICATION FILED OCT. 9, 1918. RENEWED JUNE 7, 1921.
1,384,696.
Patented July 12, 1921.
9 SHEETS—SHEET 5.
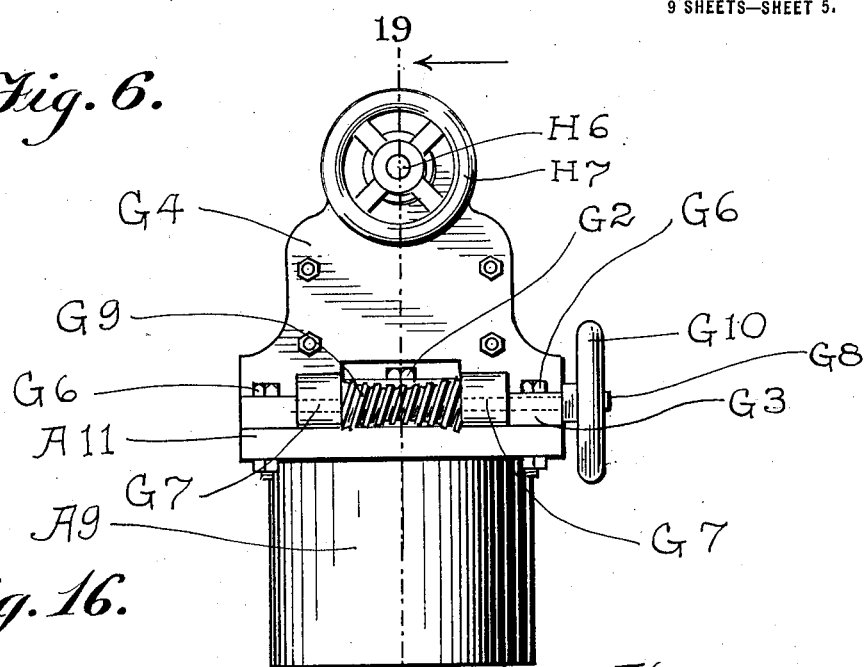
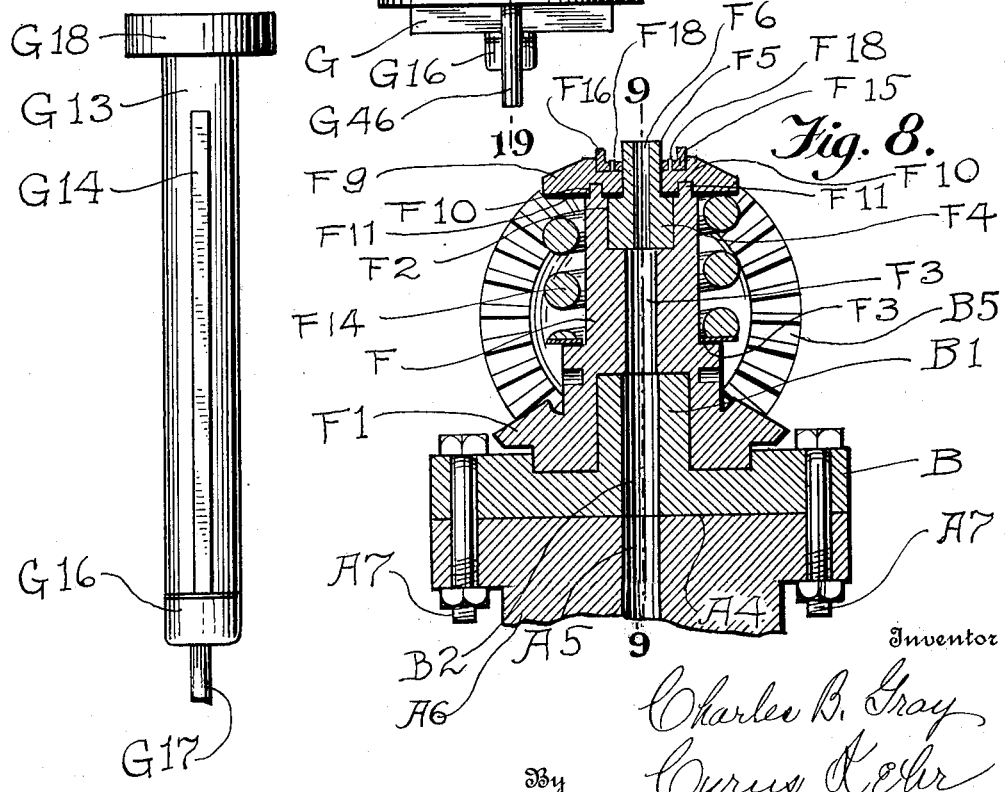

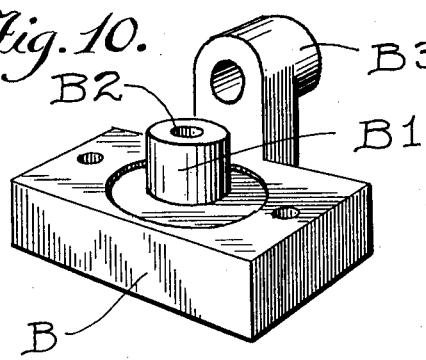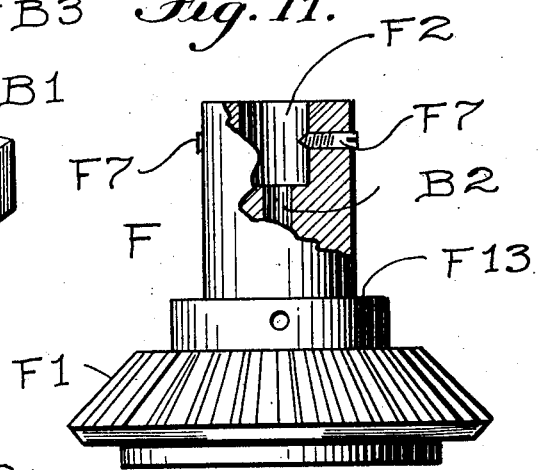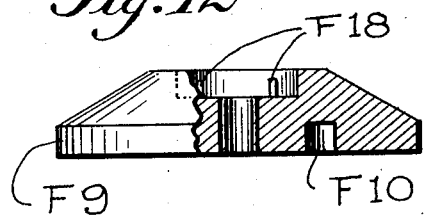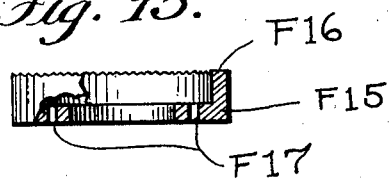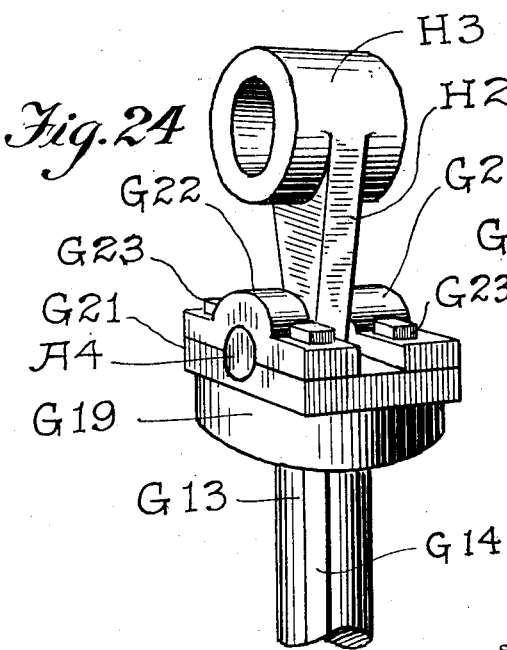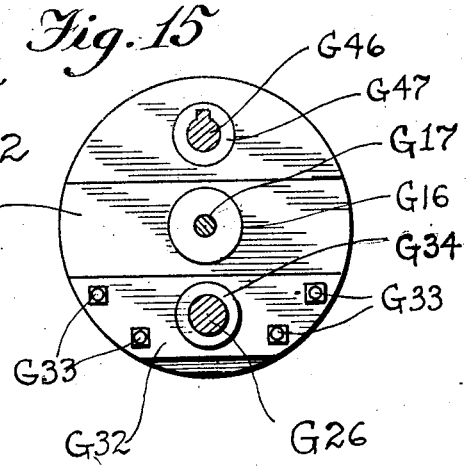

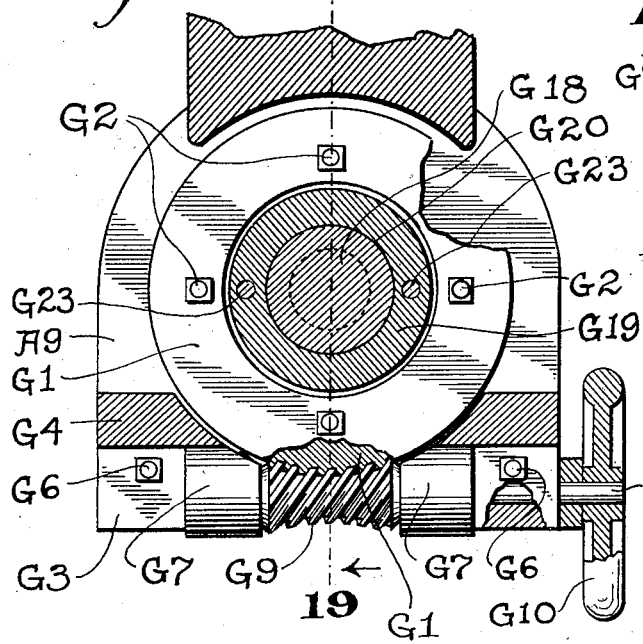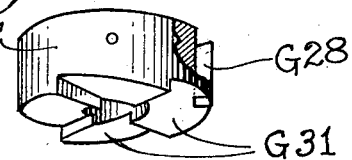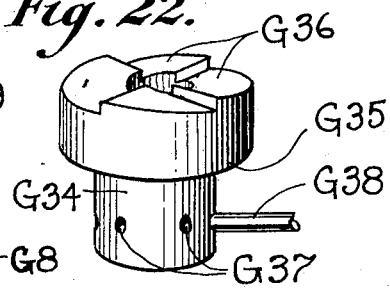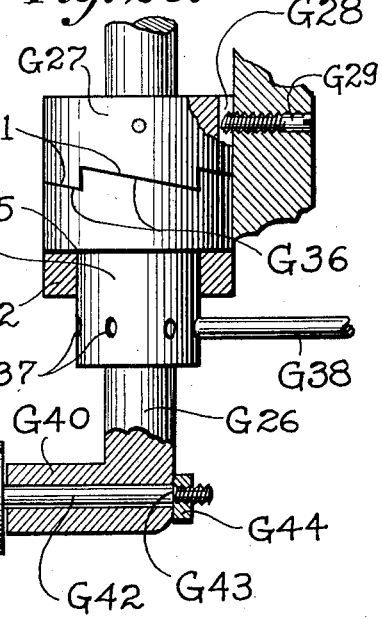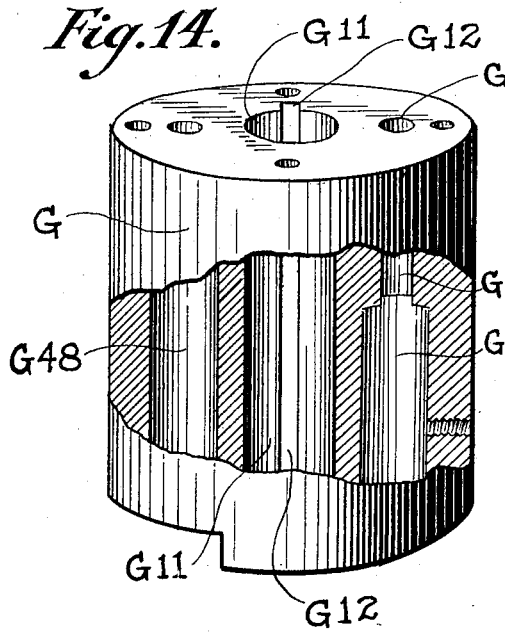

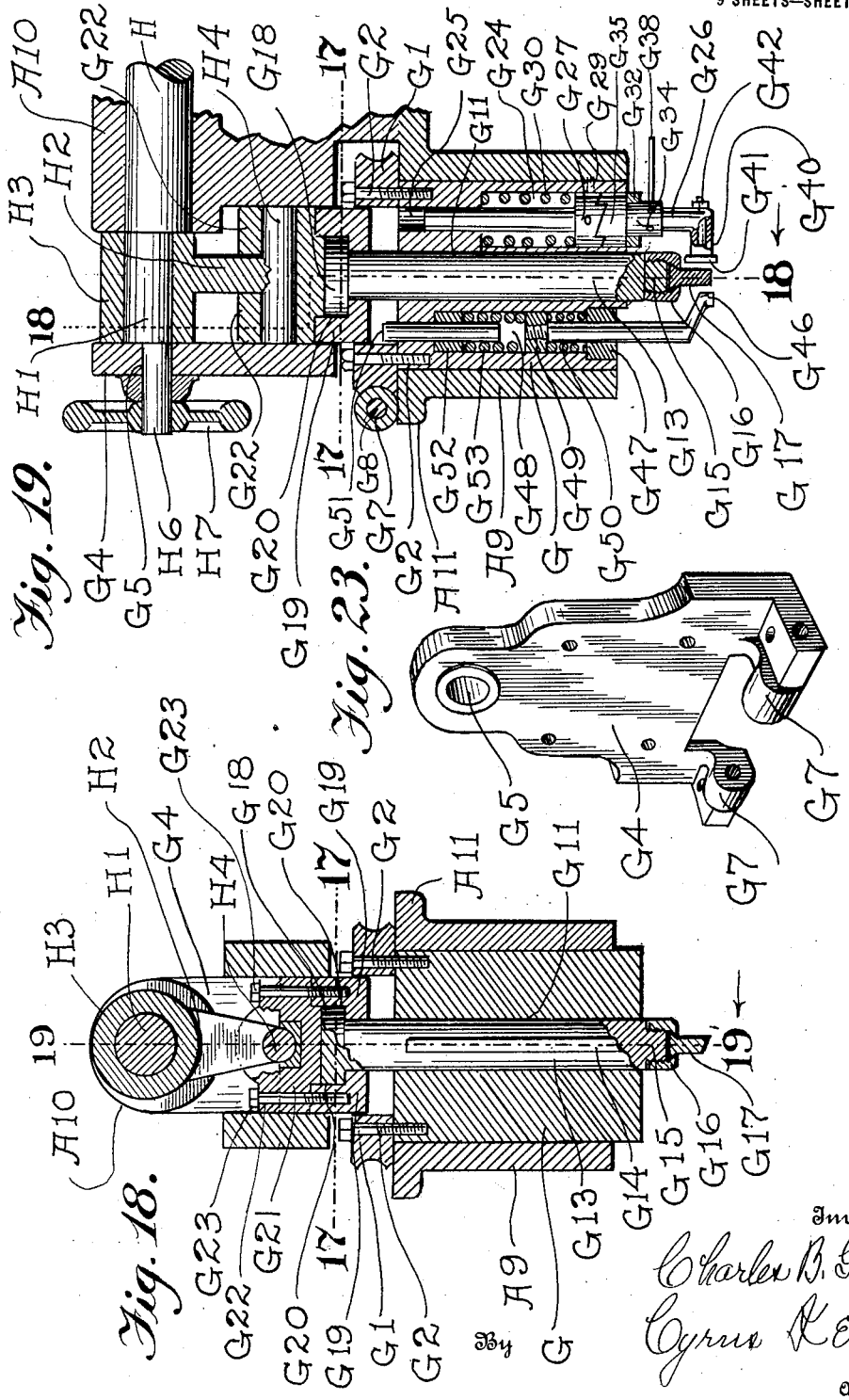

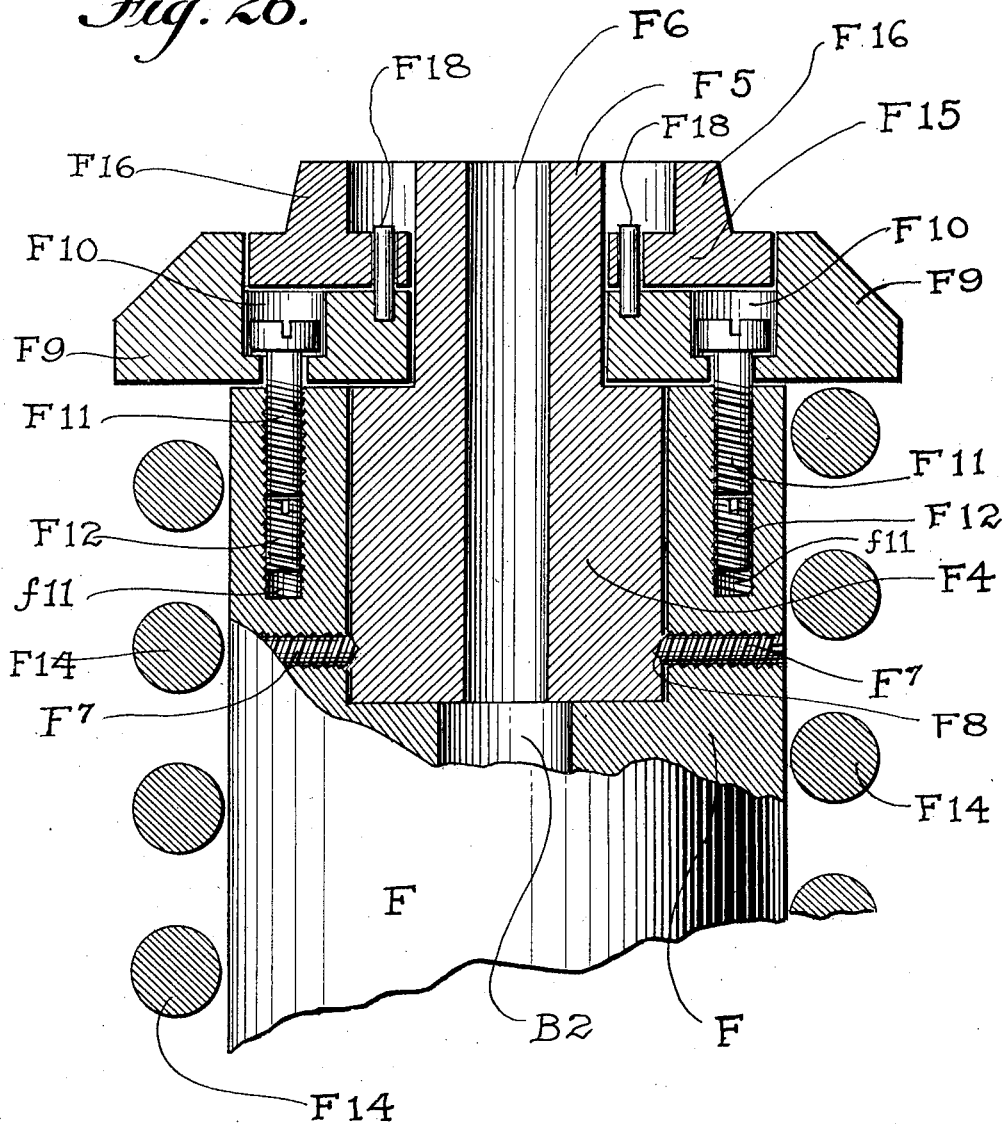

UNITED STATES PATENT OFFICE.

CHARLES BAXTER GRAY, OF PHILADELPHIA, PENNSYLVANIA.

MACHINE FOR CUTTING SHEET-FORM MATERIAL.

1,384,696.     Specification of Letters Patent.     Patented July 12, 1921.

Application filed October 9, 1918, Serial No. 257,501. Renewed June 7, 1921. Serial No. 475,829.

*To all whom it may concern:*

Be it known that I, CHARLES BAXTER GRAY, a citizen of the United States, residing at Philadelphia, in the county of Philadelphia and State of Pennsylvania, have invented a new and useful Improvement in Machines for Cutting Sheet-Form Material, of which the following is a specification, reference being had to the accompanying drawing.

My improvement relates particularly to machines comprising a die and a punch for punching thick sheet metal.

One object of the improvement is to provide a machine by means of which the operator may at will punch holes which are distinct and separate from each other or that he may cause the punch strokes to so overlap on the sheet as to cut away the sheet piece by piece to form an opening larger than the cross-section of the punch, and particularly to cause the overlapping strokes to be delivered on a line or path, whereby a slot having a width of the thickness of the punch and taking any course desired by the operator is formed, to the end that the same machine may be conveniently used for punching distinct holes or for forming channels or slots or other openings in such sheets.

A further object of the invention is to provide in such a machine automatic means for controlling the sheet which is to be punched and to automatically impart thereto a step-by-step motion, the length of each step corresponding to the distance the sheet is to advance between strokes of the reciprocatory punch.

A further object of the invention is to provide such a machine having such feed mechanism provided with means controlled by the operator for varying the direction of the action of the feed mechanism, in order that the operator may at will cause the feed mechanism to move the sheet step-by-step in any direction in the plane of the sheet.

In the accompanying drawings,

Figure 1 is a front elevation of a machine embodying my improvement;

Fig. 2 is an end elevation looking toward the right of the machine in Fig. 1;

Fig. 3 is an end elevation looking toward the left as shown in Fig. 1;

Fig. 4 is a plan of the machine shown in Fig. 1;

Fig. 5 is a front elevation of the left hand part of the machine, the scale being larger than in Fig. 1;

Fig. 6 is an elevation looking toward the right of the upper part of the machine shown by Fig. 5;

Fig. 7 is a plan of the mechanism which is located below the line, 7—7, of Figs. 2 and 5.

Fig. 8 is an upright section on the line, 8—8, of Fig. 7;

Fig. 9 is an upright section on the line, 9—9, of Figs. 7 and 8;

Fig. 10 is a perspective view of a chair casting upon which the die block is supported separated from other members;

Fig. 11 is an elevation of the die block separated from other members, a part being broken away;

Fig. 12 is a detached sectional view of the feed ring base;

Fig. 13 is a detached sectional view of the feed ring;

Fig. 14 is a sectional perspective of the turret body separated from the other parts;

Fig. 15 is a bottom view of the turret body;

Fig. 16 is an elevation of the punch stem and the punch attached to the stem;

Fig. 17 is a horizontal section on the line 17—17, of Figs. 2 and 5;

Fig. 18 is an upright section on the line, 18—18, of Fig. 19, looking toward the right;

Fig. 19 is an upright section on the line, 19—19, of Figs. 6, 17 and 18;

Fig. 20 is a detached sectional elevation of the primary presser mechanism;

Fig. 21 is a perspective view of a cam sleeve;

Fig. 22 is a perspective view of a cam member associated with the sleeve of Fig. 21;

Fig. 23 is a perspective view of a front plate;

Fig. 24 is a perspective view of means for connecting the punch stem with the drive shaft;

Fig. 25 is a rear view of a part of the machine;

Fig. 26 is an upright, sectional view showing a mechanism for controlling the feed ring base plate.

The part of the machine shown by Fig. 1 is to be regarded as the front of the machine. The plane in which the sheet, S, (Fig. 5) to be punched lies is herein termed the sheet plane.

Referring to said drawings, A is the body of the machine. This has an upper arm, A¹, and a lower arm, A², and a horizontal base, A³, which is to rest on a floor or foundation.

On the outer or left hand end of the arm, A², is a horizontal seat, A⁴, on which rests a chair casting, B, on which is supported the die and the lower part of the mechanism which is concerned with the feeding of the sheet step-by-step between the strokes of the punch, the latter being located above the sheet plane. Bolts, A⁷, extend through the casting, B, and the seat, A⁴, to bind the casting to said seat. On the axial line of the punching mechanism, the casting, B, has an upright-directed cylindrical neck, B¹. An upright discharge throat, B², extends downward through said neck and casting and registers with a similar throat, A⁵, extending downward through the seat, A⁴, and the extension, A⁶, of the arm, A². The right hand portion of the casting, B, comprises a horizontal bearing, B³, which receives the left hand end of a horizontal feed shaft, B⁴. The right hand end of said shaft extends through a bearing, C¹, in the standard, C, which is secured to the right hand end of the body, A, by means of bolts, A⁸.

A rotary die block, F, rests upon the upper face of the horizontal part of the casting, B, and surrounds the neck, B¹, and rises above said neck nearly to the sheet plane. The neck, B¹, forms a journal for the rotation of the block, F. On the lower part of the block, F, is a horizontal bevel gear, F¹, which is concentric to the neck, B¹, and has its teeth directed upward to mesh with the bevel gear wheel, B⁵, supported by the feed shaft, B⁴, at the left of the bearing, B³. In the upper end of the block, F, and on its axial line is a die socket, F². From the lower end of said socket a throat, F³, extends downward to meet the throat, B², of the casting, B. The body of the die, F⁴, is seated in the socket, F², and has a cylindrical neck, F⁵, extending above said socket. The bore, F⁶, of the die extends from the upper end of the neck downward through the die and registers with the throat, F³, of the die block, F. Said bore is cylindrical in cross section. The body of the die is held in the socket, F², by screws, F⁷, extending horizontally through the die block into sockets, F⁸, formed in the upright face of the body of the die.

On the upper end of and concentric with the die block is a feed ring base, F⁹, which has in the lower part upright sockets, F¹⁰, each of which receives an upright post, F¹¹, rising from the upper end of the block, F. Said posts are long enough to allow limited up and down movement of said base. Below the feed ring base the block, F, has a shoulder, F¹³, and between said base and the shoulder, F¹³, the block, F, is surrounded by an expanding coiled spring, F¹⁴, which normally holds the base, F⁹, a little above the upper end of the block, F, in order that the base, F⁹, may be free to be pressed downward as hereinafter described. The posts, F¹¹, compel the rotation of the base, F⁹, in unison with the block, F, when the latter is rotated.

The lower part of the base, F⁹, has a cylindrical bore of proper diameter to receive the neck, F⁵, of the die. Said neck rises high enough to be a little above the upper face of the base, F⁹, when the latter has been pressed downward to its lower limit. In the upper part of the base, F⁹, the neck of the die is surrounded by an annular chamber in which rests a feed ring, F¹⁵, having an upright flange or crown, F¹⁶. This ring has two upright sockets, F¹⁷, which receive upright studs, F¹⁸, rising from the base, F⁹, in the annular socket or chamber at each side of the neck, F⁵, of the die.

The ring, F¹⁵, normally rises above the die to press against the lower face of the sheet, S. When the punch bears downward on the sheet, the latter is depressed and forces the feed ring and the base, F⁹, downward against the action of the spring, F¹⁴, until such downward movement is arrested by contact of the metal sheet with the upper face of the die. When the punch is again moved upward, the spring, F¹⁴, lifts the base, F⁹, and the feed ring, whereby the metal sheet is lifted slightly away from the upper face of the die. The purpose of this lifting is to make any "bur" formed by the punching and extending into the die socket be above said socket before the feed mechanism acts upon the sheet for feeding the sheet, S, a step horizontally while the punch is above the sheet. I have found that when such burs form, they interfere with the horizontal feeding of the metal sheet if the sheet is left in contact with the upper face of the die and the bur is left to extend into the bore or socket of the die, even when the bur is small. I have also found that when the bur is allowed to remain on the sheet, the feeding of the sheet is hindered or entirely interrupted when the bur engages the upper edge of the feed ring. But practice has shown that under the construction above described, if the sheet is lifted so as to make the bur clear the socket during horizontal movement of the sheet and the sheet is moved only far enough by the feed mechanism to leave the bur above the upper face of the die, the bur is flattened or driven upward on the sheet when the sheet is driven downward by the next stroke of the punch. Thus, the bur is obliterated before it reaches the plane of the feed ring by the lateral, step-by-step movement of the sheet; and the lower face of the sheet is adapted to move over the flange or crown of the feed ring without hindrance.

The upper face of the flange, F¹⁶, of the ring, F¹⁴, is roughened to adapt it to engage the metal sheet and advance the latter through the desired distance every time the punch is in its upper range; and the diameter of the ring is made such as to best suit it to feed the sheet.

It will be understood that the base, $F^9$, and the feed ring, $F^{15}$, might be made as a unitary structure; but I prefer to make the ring separately, in order that it may be more accurately formed and tempered and in order that it may be renewed without renewing the entire structure. Furthermore, the upright flange or crown of the ring must be made of a high quality of steel, while the body of the base may be formed of a common quality of metal. Hence this separation permits economy in materials.

The feed ring crown is rotated in unison with the base, $F^9$, and said base rotates in unison with the die block, and the die block is given a step-by-step rotation by means of the bevel gear wheels, $F^1$ and $B^5$, the latter receiving a step-by-step rotation by the step-by-step turning of the feed shaft, $B^4$, as will be described farther on.

The direction of the feed imparted to the metal sheet depends upon the direction of rotation of the die block and the location of the pressure put upon the sheet above the crown ring by presser mechanism located above the sheet and forming a part of the feed mechanism and adapted to be shifted into various positions around the punch axis, as will be described farther on.

On the left hand end of the arm, $A^1$, of the body, A, of the machine is an upright bearing, $A^9$, in which rests a rotary turret body, G. A ring-form worm gear wheel $G^1$, rests upon the upper end of the bearing, $A^9$, and extends across a portion of the upper end of the turret body and is secured to the latter by means of upright bolts, $G^2$, extending through said worm gear into said body. Thus said body is free for rotation within said bearing, but is held by the worm gear wheel against downward movement.

Above the bearing, $A^9$, and a little at the right of the axial line of said bearing is a horizontal bearing, $A^{10}$, formed on the arm, $A^1$, of the body, A.

The left hand portion of the upper end of the bearing, $A^9$, has a horizontal flange, $A^{11}$, which forms a seat for the foot, $G^3$, of an upright front plate, $G^4$, which has in its upper part a bearing, $G^5$, which is in axial alinement with the bearing, $A^{10}$. Bolts, $G^6$, bind the plate, $G^4$, to the flange, $A^{11}$. On the lower part of the front plate, $G^4$, are two horizontal bearings, $G^7$, in which is supported a screw shaft, $G^8$, which has a worm, $G^9$, engaging the worm gear wheel, $G^1$. On the front end of said worm shaft is the hand wheel, $G^{10}$. By turning said hand wheel, said worm wheel and the turret body, G, may be slowly rotated, the worm wheel sliding on the upper end of the bearing, $A^9$. When said hand wheel is at rest, the worm, $G^9$, locks the worm gear wheel, whereby the turret body is securely held against rotation.

On the axial line of the turret body, G, is an upright bore, $G^{11}$, extending through the body and in which is an upright key way, $G^{12}$. In said bore is a cylindrical, reciprocatory punch supporting stem, $G^{13}$ on the lower end of which is a screw threaded neck, $G^{15}$, which is surrounded by an interiorly screw threaded sleeve, $G^{16}$, in the lower end of which is a punch, $G^{17}$, which is in axial alinement with said stem and with the bore, $F^6$, of the die, $F^4$, which has already been described.

The upper end of said stem extends above the body, G, and the worm gear wheel, $G^1$, and there has a cylindrical head, $G^{18}$, which rests in a bearing formed by a socket, $G^{20}$, in a coupling member, $G^{19}$, which is applied to the lower face of a coupling member, $G^{21}$, which is applied to the lower face of coupling members, $G^{22}$. Said members, $G^{19}$, $G^{21}$ and $G^{22}$, are joined to each other by upright cap screws, $G^{23}$, extending through apertures in the members, $G^{22}$ and $G^{21}$, and into threaded apertures in the member, $G^{19}$. The stem, $G^{13}$, has a key or feather, $G^{14}$, extending into the keyway, $G^{12}$, of the turret body, G, so that said stem is free to slide up and down in the body, G, but cannot turn independently of said body and must turn when said body turns. The coupling body formed by the members, $G^{19}$, $G^{21}$ and $G^{22}$, does not turn, but the cylindrical head, $G^{18}$, of the punch stem is free to rotate in the bearing formed by the socket, $G^{20}$, in the member, $G^{19}$. Thus the worm gear wheel, $G^9$, the turret body, G, and the punch stem, $G^{13}$, are at all times free to turn on the upright axis of the bearing, $A^9$, irrespective of the height of the coupling body. At the same time the punch stem and the coupling body are free to move upward and downward irrespective of the positions into which the turret body, G, has been at the time turned.

The function of the coupling body is to connect the punch stem with the horizontal eccentric crank shaft, H, which rests in the bearings, $A^{10}$ and $G^5$, and has between said bearings the eccentric, $H^1$. Said eccentric rests in the eye, $H^3$, of the pendulum or pitman, $H^2$. At the lower end of the pendulum is a cross arm, $H^4$, which rests in the bearing formed between the coupling members, $G^{21}$ and $G^{22}$. The left hand end of the shaft, H, is shown reduced in diameter to form a neck, $H^6$, which extends leftward through the bearing, $G^5$, and there supports a hand wheel, $H^7$, by means of which the operator may turn said shaft by hand when the punch stem is to be raised or lowered while power is not being applied to the right hand end of the shaft, H, as hereinafter described.

The turret body, G, supports a primary presser which is a part of the feed mechanism and coöperates with the feed ring in engaging the metal sheet, S, for shifting the latter during the step-by-step movement of the feed ring. This presser and the parts associated therewith will now be described.

At one side of the bore, $G^{11}$, is an upright, cylindrical chamber, $G^{24}$, extending upward from the lower end of the turret body. Said chamber is shown as extending only a little way above the middle of the length of the turret body. From the upper end of said chamber and in axial alinement with the chamber a cylindrical bore, $G^{25}$, extends upward through the turret body. The presser comprises a cylindrical stem, $G^{26}$, an arm, $G^{40}$, and a wheel, $G^{41}$. The stem extends upward through the chamber, $G^{24}$, and into the bore, $G^{25}$, into which it fits slidably. In the lower portion of the chamber, $G^{24}$, said stem is surrounded by a sleeve, $G^{27}$, which is pinned to the stem and fits the chamber slidably. Said sleeve has on its outer face an upright groove, $G^{28}$, into which extends a screw, $G^{29}$, which is seated horizontally in the adjacent wall of the turret body. By this means, said sleeve and said stem are limited to upright movement. An expanding coiled spring, $G^{30}$, surrounds the stem above said sleeve and bears against the upper wall of said chamber. The lower face of the sleeve, $G^{27}$, has cam faces, $G^{31}$. Below the chamber, $G^{24}$, is a horizontal bridge, $G^{32}$, which is secured to the lower face of the turret body by cap screws, $G^{33}$ (Fig. 15).

A lower cam member, $G^{34}$, extends rotatably through the bridge, $G^{32}$. Above the bridge, the member, $G^{34}$, has a downward-directed shoulder, $G^{35}$, resting upon the bridge, whereby said member is held against downward movement through the bridge. At its upper end, said member has upward directed cam faces, $G^{36}$, corresponding, in reverse, to the cam faces, $G^{31}$, on the sleeve, $G^{27}$. The stem, $G^{26}$, extends slidably through the cam member, $G^{34}$. Below the bridge, said member has sockets, $G^{37}$, adapted to receive one end of a bar or handle, $G^{38}$, by means of which the operator may turn the member, $G^{34}$. Said bar, $G^{38}$, may be transferred from one socket, $G^{37}$, to another, as may be found desirable for convenient manipulation. Turning the member, $G^{34}$, so as to make the faces, $G^{36}$, slide over the faces, $G^{31}$, will force the sleeve $G^{27}$, upward. Since said sleeve is immovably secured to the stem, $G^{26}$, said stem is lifted when the sleeve is lifted. When the body, $G^{34}$, is turned in the opposite direction, the sleeve, $G^{27}$, and the stem, $G^{26}$, are allowed to descend in response to the action of gravity and the spring, $G^{30}$. On the lower end of the stem, $G^{26}$, the horizontal arm, $G^{40}$, is directed toward the punch, $G^{17}$. At the free end of said arm is a presser wheel, $G^{41}$, which is rigidly secured to the shaft, $G^{42}$, which extends through said arm lengthwise and is fitted for rotation therein. The end of said shaft which is opposite the wheel projects through the stem, $G^{26}$, and is screw threaded and provided with a shoulder, $G^{43}$. A nut, $G^{44}$, is threaded on said end and bears against said shoulder. Thus said shaft and axle and said wheel are free to rotate when said wheel bears against the horizontally moving sheet of material.

Said wheel is located above the rim or crown of said feed ring, $F^{15}$, in position to produce opposing pressure between a portion of the periphery of said wheel and a portion of the flange or crown of the feed ring when the metal sheet is located between said members and the hand lever, $G^{34}$, has been turned so as to allow the stem, $G^{26}$, and the arm, $G^{40}$, to be free for downward pressure by the spring, $G^{30}$.

By turning the turret body, G, the stem, $G^{26}$, and the wheel, $G^{41}$, will be carried around the common axis of the turret body and the punch stem and the punch and the feed ring, the presser wheel, $G^{41}$, moving is an orbital path which is concentric to said axis and which orbital path maintains a uniform relation to the flange or crown of the feed ring. By means of the hand wheel, $G^{10}$, the turret body may be turned in either direction, hence the wheel, $G^{41}$, may traverse its orbital path in either direction.

When the feed ring is turned a step by the partial rotation of the feed shaft, $B^4$, the feed ring and the wheel, $G^{41}$, move the metal sheet, S, correspondingly. The direction of such movement will depend upon the direction of rotation of the feed ring and the position of the wheel, $G^{41}$, in its orbital path.

The wheel, $G^{41}$, stands in an upright plane which is tangential to said orbital path and also to the crown of the feed ring, and the movement imparted to the sheet, S, is parallel to said plane. Said plane changes position and direction with the turning of the turret body. Hence by turning the turret body any desired direction may be given to the feed imparted to the sheet, S, by the joint action of the feed wheel, $G^{15}$, and the presser wheel, $G^{41}$.

As already described, when the punch rises from the sheet, S, the spring, $F^{14}$, lifts the base plate, $F^9$, and the feed ring for the purpose of slightly lifting the sheet from the upper face of the die, in order that the bur on the lower face of the sheet may clear the die socket. This lifting of the base plate also increases the engagement of the sheet between the feed ring and the presser wheel, $G^{41}$, at the time that the feed ring is to be turned a step for the shifting of the sheet into position for the next stroke of the punch.

The spring, $F^{14}$, is stronger than the spring, $G^{30}$, so that the latter must yield during the upward movement of the base plate, $F^9$.

Supported by the turret body at the side of the turret axis opposite the primary presser is a secondary presser, $G^{46}$. Said presser comprises an upright stem which is endwise slidable and feathered in a tubular bearing, $G^{47}$, (Figs. 15 and 19) seated in the lower end of an upright cylindrical chamber, $G^{48}$, (Figs. 14 and 19) extending upward from the lower end of the turret body. The upper end of said stem is secured in a slide member and said bearing, and said stem is surrounded by an expanding coiled spring, $G^{50}$. A stem, $G^{51}$, extends slidably through the upper end of the turret body and downward into the chamber, $G^{48}$. Said stem is in any manner fixed in the collar, $G^{52}$, and said collar is slidable in said chamber. Between said collar and the slide member, $G^{49}$, is an expanding coiled spring, $G^{53}$.

When the collar, $G^{52}$, bears against the upper wall of the chamber, $G^{48}$, the stem, $G^{51}$, extends upward into the lower portion of the path of the lower member, $G^{19}$, of the coupling block which engages the upper end of the punch stem. The springs, $G^{50}$, and $G^{53}$, are so proportioned as that under this condition the spring, $G^{50}$, is expanded sufficiently in opposition to the spring, $G^{53}$, to raise the secondary presser away from the sheet, S. But when the coupling member, $G^{19}$, moves downward to its lower limit for moving the punch downward to its lower limit, the member, $G^{19}$, bears upon the stem, $G^{51}$, and presses it downward, whereby the collar, $G^{52}$, forces the spring, $G^{53}$, downward against the slide member, $G^{49}$, with sufficient force to drive the slide member downward in opposition to the spring, $G^{50}$. In order that this may be accomplished, the spring, $G^{50}$, is made weaker than the spring, $G^{53}$. The action of the secondary presser upon the sheet is to be so much less than the action of the primary presser as to preclude interference by the secondary presser with the action of the primary presser in coöperating with the feed ring, $F^{15}$, to make such engagement of the sheet as will compel the sheet to move with the movement of the part of the feed wheel which is directly below the presser wheel, $G^{41}$. Indeed, the secondary presser need not make engagement at all with the sheet during the down stroke of the punch. A minor function of said presser is to prevent tilting of the sheet. For this, either light contact with or nearness to the sheet will answer. The main function of this presser is to coöperate with the presser wheel in resisting upward movement when the punch is moving upward to release itself from the sheet after the down stroke of the punch has been completed. In this connection it is to be observed that the depression of the stem, $G^{51}$, by the coupling member, $G^{19}$, is maintained during the lower travel of the punch. This period of depression is to be so adjusted as to continue until the lower end of the punch has risen above the sheet, whereby the secondary presser remains in the lower position as long as its resistance to the upward movement of the sheet is needed. It is not to be understood that the punch will at all times tend to lift the sheet during the upward movement of the punch. The secondary presser is thus associated with the primary presser in order that it may be available at such times as the punch does tend to lift the sheet.

Attention is directed to the fact that while the turning of the turret body carries the primary presser into a new position in its orbital path, whereby the direction of feed of the sheet is changed, the punch stem and the punch are at the same time correspondingly turned, so that the relation of the punch to the direction of feed remains unchanged. That is to say, the same part of the upright face of the punch is always directed toward the approaching part of the sheet when the sheet is being fed by the feed mechanism. This allows making the lower end of the punch of any special shape to facilitate the cutting or to modify the cut. For example, the lower end of the punch may be made slanting, as shown by the drawings (Figs. 2, 16 and 19), the lower part being made the part toward which the sheet is moved by the feed mechanism.

If the lower end of the punch is made cylindrical and its lower face is not inclined, the punch stem and the punch need not be turned with the turret body; for then the action of the punch is the same regardless of what part thereof is approached by the sheet.

It is also to be noted that punches of different forms may be used interchangeably. For example, if distinct and separate holes are to be punched, a punch best suited to that purpose may be applied to the punch stem, and if overlapping punch strokes are to be delivered to the sheet for cutting larger openings, a punch best suited to that purpose may be applied to the punch stem.

The shaft, H, is driven by means which will now be described.

A bearing, $A^{12}$, on the right hand part of the body, A, and a bearing, $C^2$, on the upper end of the standard, C, support the right hand end of said shaft.

In a bearing, $A^{13}$, on the body, A, and in a bearing, $C^3$, in the standard, C, is a drive shaft, $D^1$, on which is a pulley, D, which receives rotation continuously from a belt (not shown). Immediately at the left of the standard, C, a fly wheel, $D^2$, surrounds said shaft. Between said wheel and the bearing, $A^{13}$, a small spur gear wheel, $D^3$, surrounds said shaft and is rigid thereon. Meshing with said spur gear wheel and loosely surrounding the shaft, H, is a larger spur gear wheel, $D^4$, which has at its left a clutch member, $D^5$, which is adapted to make engagement with a clutch member, $D^6$, which is feathered on said shaft. A bell-crank, $D^7$—$D^8$, is supported in the bearing, $A^{14}$, above the clutch member, $D^6$. The bearing, $A^{14}$, is supported on the bearing, $A^{12}$. The arm, $D^7$, of said bell crank is forked and engages the clutch ring, $d^6$, which surrounds the clutch member, $D^6$. By rocking said bell-crank, the clutch member, $D^6$, is moved into and out of engagement with the clutch member, $D^5$. When said clutch members are in engagement, the rotation of the spur gear wheel, $D^4$, compels the rotation of the clutch member, $D^6$, and the rotation of that member compels the rotation of the shaft, H, in a manner familiar to the art. A connecting rod, $D^{10}$, extends slidably through a bearing, $A^{15}$, on the body, A, and has its upper end coupled to the arm, $D^8$, of the bell-crank while its lower end is coupled to an arm, $D^{11}$. An expanding coiled spring, $D^9$, surrounds said rod between the bearing, $A^{15}$, and the arm, $D^8$. Said spring tends to push the arm, $D^8$, upward, whereby the arm, $D^7$, of the bell-crank is moved toward the left— the direction for disengaging the clutch member, $D^6$, from the clutch member, $D^5$. Hence said clutch is normally out of engagement and the shaft, H, is normally at rest. The arm, $D^{11}$, is rigid on a rock shaft, $D^{12}$, which is supported in the right hand portion of the body, A, close to the base, $A^3$. An arm, $D^{13}$, is rigid on said rock shaft and extends horizontally to the left hand end of the machine and is adapted to there extend below and into engagement with a lug, $D^{14}$, projecting forward on the body of the machine. The arm, $D^{13}$, has sufficient flexibility to adapt it to be moved by the foot of the operator into and out of engagement with the lug, $D^{14}$.

When the operator desires to have the shaft, H, rotate for the reciprocation of the punch, he presses his foot downward on the left hand end of the arm, $D^{13}$, far enough to move the clutch member, $D^6$, into engagement with the clutch member, $D^5$. If the punch is to make only one or some other small number of strokes, the operator holds the arm, $D^{13}$, without causing it to make engagement with the lug, $D^{14}$. If the punch is to be reciprocated an indefinite number of times, the operator may press the arm, $D^{13}$, into engagement with the lug, $D^{14}$, and there leave said arm until the reciprocation of the punch is to be stopped.

The die block, F, which carries the feed ring, $F^{15}$, as above described, receives its step-by-step rotation through a partial rotation of the feed shaft, $B^4$, during every full rotation of the shaft.

On the right hand end of the shaft, $B^4$, is a ratchet wheel, E, secured rigidly to said shaft. A rocking member, $E^1$, has a bearing, $E^3$, surrounding the shaft, $B^4$. To the opposite end of the rocking member, $E^1$, is coupled the lower end of a connecting bar, $E^7$. The upper end of said bar is coupled to the free end of a lever, $E^8$, which extends across a cam, $E^9$, which is rigid on the shaft, H, at the right of the bearing, $C^2$. The opposite end of the arm, $E^8$, is hinged to an extension, $C^4$, of the standard, C. A contracting coiled spring, $E^{10}$, has one end secured to the rocking member, $E^1$, while the other end is secured to a stationary bracket, $A^{16}$, extending rightward from the body, A. Said spring is under constant tension and draws downward on the rocking member, $E^1$, and causes the latter to draw the connecting bar, $E^7$, and the arm, $E^8$, downward as far as the cam, $E^9$, permits. Said cam has a single extension, $e^9$, which lifts the arm, $E^8$, once during each rotation of the shaft, H. On the rocking member, $E^1$, is a pawl, $E^4$, which bears against the periphery of the ratchet wheel, E. A blade-spring, $E^5$, is secured to the rocking member, $E^1$, in position to yieldingly bear against said pawl in order that the pawl may be yieldingly held against the ratchet wheel. On the standard, C, is a pawl, $E^{11}$, with its free end bearing against the periphery of the ratchet wheel. The function of this pawl is to oppose backward movement of the ratchet wheel during the backward movement of the pawl, $E^4$, which as above described, is supported by the rocking member, $E^1$. The various parts concerned with this transmission of motion from the shaft, H, to the feed shaft, $B^4$, are so proportioned as to cause the pawl, $E^4$, to slip from one ratchet tooth to another during each movement of the rocking member, $E^1$, whereby the feed shaft, $B^4$, is put through a fraction of a rotation represented by the space between the edges of two adjacent ratchet teeth.

The above-described transmission mechanism has heretofore been used for similarly imparting a step-by-step partial rotation to one shaft from another shaft which makes complete rotation; and it is to be understood that, in connection with my present improvement, any suitable means may be used for imparting to the feed shaft, $B^4$, its step-by-step rotation. Indeed, it is to be noted that said shaft is only a means to an end, namely, the step-by-step rotation of the feed ring, $F^{15}$.

It is also to be observed that the mechanism for transmitting motion from the pulley, D, to the shaft, H, is not new.

In Fig. 26 is shown mechanism for permitting up and down movement of the feed ring base, $F^9$, and adjustably limiting such movement. In this form, the feed ring is extended across the sockets, $F^{10}$, in the ring base and said sockets extend through said base and are countersunk from above, and the posts, $F^{11}$, rising from the upper end of the block, F, have screw heads and are exteriorly screw threaded within the chamber, $f^{11}$, said chamber being correspondingly interiorly screw threaded. Below the screw post, $F^{11}$, is a screw plug, $F^{12}$, which also fits the interior threading of the chamber, $f^{11}$. This screw plug is to be turned to bring it to the proper height to make it bear against the post, $F^{11}$, when the latter is driven down to the desired position. By the engagement thus effected between the post and the plug, the post is "jammed" and held against turning by vibration.

I claim as my invention,

1. In a machine for punching sheet-form material, a die located at one side of the sheet plane, a reciprocatory punch located at the other side of the sheet plane in alinement with the die, sheet feeding means located adjacent the die and at the same side of the sheet plane and adapted to bear against a sheet in the sheet plane in any part of a circle surrounding the die axis, automatic means for giving said part of the sheet feeding means a step-by-step movement for feeding said sheet, presser feed means at the opposite side of the sheet plane, and operator-controlled means for moving said presser feed means around the die axis independently of the part of the feeding means which is at the opposite side of the sheet plane, whereby the relation between the two parts of the feeding means is varied for changing the direction of movement of the sheet, substantially as described.

2. In a machine for punching sheet-form material, a die located at one side of the sheet plane, a reciprocatory punch located at the other side of the sheet plane in alinement with the die, sheet feeding means surrounding the die and adapted to bear against a sheet in the sheet plane in any part of a circle surrounding the die axis, automatic means for giving said part of the sheet feeding means a step-by-step movement for feeding said sheet, presser feed means at the opposite side of the sheet plane, and operator-controlled means for moving said presser feed means around the die axis independently of the part of the feeding means which is at the opposite side of the sheet plane, whereby the relation between the two parts of the feeding means is varied for changing the direction of movement of the sheet, substantially as described.

3. In a machine for punching sheet-form material, a die located at one side of the sheet plane, a reciprocatory punch located at the other side of the sheet plane in alinement with the die, a ring-form sheet feeding means surrounding the die and adapted to bear against a sheet in the sheet plane in any part of a circle surrounding the die axis, automatic means for giving said ring a step-by-step movement around the die for feeding said sheet, presser feed means at the opposite side of the sheet plane, and operator-controlled means for moving said presser feed means around the die axis independently of said ring, whereby the relation between said presser feed means and said ring is varied for changing the direction of movement of the sheet, substantially as described.

4. In a machine for punching sheet-form material, a die located at one side of the sheet plane, a reciprocatory punch located at the other side of the sheet plane in alinement with the die, sheet feeding means located adjacent the die and at the same side of the sheet plane and adapted to bear against a sheet in the sheet plane in any part of a circle surrounding the die axis, automatic means for giving said part of the sheet feeding means a step-by-step movement for feeding said sheet, presser feed means at the opposite side of the sheet plane, and operator-controlled means for turning the punch and correspondingly moving said presser feed means around the die axis independently of the part of the feeding means which is at the opposite side of the sheet plane, whereby the relation between the two parts of the feeding means is varied for changing the direction of movement of the sheet, substantially as described.

5. In a machine for punching sheet-form material, a die located at one side of the sheet plane, a reciprocatory punch located at the other side of the sheet plane in alinement with the die, sheet feeding means surrounding the die and adapted to bear against a sheet in the sheet plane in any part of a circle surrounding the die axis, automatic means for giving said part of the sheet feeding means a step-by-step movement for feeding said sheet, presser feed means at the opposite side of the sheet plane, and operator-controlled means for turning the punch and correspondingly moving said presser feed means around the die axis independently of the part of the feeding means which is at the opposite side of the sheet plane, whereby the relation between the two parts of the feeding means is varied for changing the direction of movement of the sheet, substantially as described.

6. In a machine for punching sheet-form material, a die located at one side of the sheet plane, a reciprocatory punch located at the other side of the sheet plane in alinement with the die, a ring-form sheet feeding means surrounding the die and adapted to bear against a sheet in the sheet plane in any part of a circle surrounding the die axis, automatic means for giving said ring a step-by-step movement around the die for feeding said sheet, presser feed means at the opposite side of the sheet plane, and operator-controlled means for turning the punch and correspondingly moving said presser feed means around the die axis independently of said ring, whereby the relation between said presser feed means and said ring is varied for changing the direction of movement of the sheet, substantially as described.

7. In a machine for punching sheet-form material, a die located at one side of the sheet plane, a reciprocatory punch located at the other side of the sheet plane in alinement with the die, sheet feeding means located adjacent the die and at the same side of the sheet plane and adapted to bear against a sheet in the sheet plane in any part of a circle surrounding the die axis, automatic means for giving said part of the sheet feeding means a step-by-step movement for feeding said sheet, a presser feed wheel at the opposite side of the sheet plane, and operator-controlled means for bodily moving said presser feed wheel around the die axis independently of the part of the feeding means which is at the opposite side of the sheet plane, whereby the relation between the two parts of the feeding means is varied for changing the direction of movement of the sheet, substantially as described.

8. In a machine for punching sheet-form material, a die located at one side of the sheet plane, a reciprocatory punch located at the other side of the sheet plane in alinement with the die, sheet feeding means surrounding the die and adapted to bear against a sheet in the sheet plane in any part of a circle surrounding the die axis, automatic means for giving said part of the sheet feeding means a step-by-step movement for feeding said sheet, a presser feed wheel at the opposite side of the sheet plane, and operator-controlled means for bodily moving said presser feed wheel around the die axis independently of the part of the feeding means which is at the opposite side of the sheet plane, whereby the relation between the two parts of the feeding means is varied for changing the direction of movement of the sheet, substantially as described.

9. In a machine for punching sheet-form material, a die located at one side of the sheet plane, a reciprocatory punch located at the other side of the sheet plane in alinement with the die, a ring-form sheet feeding means surrounding the die and adapted to bear against a sheet in the sheet plane in any part of a circle surrounding the die axis, automatic means for giving said ring a step-by-step movement around the die for feeding said sheet, a presser feed wheel at the opposite side of the sheet plane, and operator-controlled means for bodily moving said presser feed wheel around the die axis independently of said ring, whereby the relation between said presser feed wheel and said ring is varied for changing the direction of movement of the sheet, substantially as described.

10. In a machine for punching sheet-form material, the combination of a die located at one side of the sheet plane, a reciprocatory punch located at the other side of the sheet plane in alinement with the die, automatic feed mechanism a part of which is located at the punch side of the sheet plane and a part of which is located at the die side of the sheet plane and presents toward the sheet plane a face which is approximately parallel to said plane, automatic means for actuating the last-mentioned part of the feed mechanism for engaging and feeding the sheet step-by-step while the punch is free from the sheet, and operator-controlled means for, independently of the part of the feed mechanism at the die side of the sheet plane, shifting the part of the feed mechanism at the punch side of the sheet plane for changing the direction of said sheet, substantially as described.

11. In a machine for punching sheet-form material, the combination of a die located at one side of the sheet plane, a reciprocatory punch located at the other side of the sheet plane in alinement with the die, automatic feed mechanism a part of which is located at the punch side of the sheet plane and a part of which is located at the die side of the sheet plane and surrounds the die and presents toward the sheet plane a face which is approximately parallel to said plane, automatic means for actuating the last-mentioned part of the feed mechanism for engaging and feeding the sheet step-by-step while the punch is free from the sheet, and operator-controlled means for independently of the part of the feed mechanism at the die side of the sheet plane shifting the part of the feed mechanism at the punch side of the sheet plane for changing the direction of said sheet, substantially as described.

12. In a machine for punching sheet-form material, the combination of a die located at one side of the sheet plane, a reciprocatory punch located at the other side of the sheet plane in alinement with the die, automatic feed mechanism a part of which is located at the punch side of the sheet plane and a part of which is located at the die side of the sheet plane and is in the form of a ring surrounding the die and presents toward the sheet plane a face which is approximately parallel to said plane, automatic means for turning said ring for engaging and feeding the sheet step-by-step while the punch is free from the sheet, and operator-controlled means for independently of said ring shifting the part of the feed mechanism at the punch side of the sheet plane for changing the direction of said sheet, substantially as described.

13. In a machine for punching sheet-form material, a die located at one side of the sheet plane, a reciprocatory punch located at the other side of the sheet plane in alinement with the die, sheet feeding means located at the die side of the sheet plane and near the die and bearing yieldingly transversely to the sheet plane to adapt it to normally press the sheet away from the die and to yield to permit the punch to press the sheet against the face of the die when the punch moves to the die, feed mechanism located at the punch side of the sheet plane and adapted to bear toward the sheet plane in opposition to the feed mechanism at the die side of the sheet plane, and automatic mechanism for imparting a step-by-step motion to the feed mechanism at the die side of the sheet plane, whereby the sheet is fed parallel to the sheet plane while the sheet is held away from the face of the die, substantially as described.

14. In a machine for punching sheet-form material, a die located at one side of the sheet plane, a reciprocatory punch located at the other side of the sheet plane in alinement with the die, sheet feeding means located at the die side of the sheet plane and around the die and bearing yieldingly transversely to the sheet plane to adapt it to normally press the sheet away from the die and to yield to permit the punch to press the sheet against the face of the die when the punch moves to the die, feed mechanism located at the punch side of the sheet plane and adapted to bear toward the sheet plane in opposition to the feed mechanism at the die side of the sheet plane, automatic mechanism for imparting a step-by-step motion to the feed mechanism at the die side of the sheet plane, whereby the sheet is fed parallel to the sheet plane while the sheet is held away from the face of the die, and operator-controlled means for shifting the contact between the feed mechanism at the punch side and the sheet relative to a location in a path extending around the die axis whereby the direction of movement of the sheet in the sheet plane may be varied, substantially as described.

15. In a machine for punching sheet-form material, a die located at one side of the sheet plane, a reciprocatory punch located at the opposite side of the sheet plane, feed mechanism a part of which is located at the die side of the sheet plane and a part of which is located at the punch side of the sheet plane and each being adapted to press yieldingly toward the sheet plane, the part at the die side of the sheet plane being adapted to exert the stronger pressure, whereby the sheet, when in position between said parts of the feed mechanism is normally held away from the die and is pressed against the die by the punch when the latter moves to the die, and automatic means for actuating said feed mechanism for feeding the sheet in the sheet plane, substantially as described.

16. In a machine for punching sheet-form material, a die located at one side of the sheet plane, a reciprocatory punch located at the opposite side of the sheet plane, feed mechanism a part of which is located at the die side of the sheet plane and a part of which is located at the punch side of the sheet plane and each being adapted to press yieldingly toward the sheet plane, the part at the die side of the sheet plane being adapted to exert the stronger pressure, means for limiting the movement of the part of the feed mechanism at the die side of the sheet plane toward the sheet plane, whereby the sheet, when in position between said parts of the feed mechanism is normally held away from the die and is pressed against the die by the punch when the latter moves to the die, and automatic means for actuating said feed mechanism for feeding the sheet in the sheet plane, substantially as described.

17. In a machine for punching sheet-form material, a die located at one side of the sheet plane, a reciprocatory punch located at the opposite side of the sheet plane, feed mechanism a part of which is located at the die side of the sheet plane and a part of which is located at the punch side of the sheet plane and each being adapted to press yieldingly toward the sheet plane, the part at the die side of the sheet plane being adapted to exert the stronger pressure, whereby the sheet, when in position between said parts of the feed mechanism is normally held away from the die and is pressed against the die by the punch when the latter moves to the die, operator-controlled means for changing the relation between the parts of the feed mechanism at the two sides of the sheet plane for changing the direction of feed of said mechanism, and automatic means for actuating said feed mechanism for feeding the sheet in the sheet plane, substantially as described.

18. In a machine for punching sheet-form material, a die located at one side of the sheet plane, a reciprocatory punch located at the opposite side of the sheet plane, feed mechanism a part of which is located at the die side of the sheet plane and a part of which is located at the punch side of the sheet plane and each being adapted to press yieldingly toward the sheet plane, the part at the die side of the sheet plane being adapted to exert the stronger pressure, means for limiting the movement of the part of the feed mechanism at the die side of the sheet plane toward the sheet plane, whereby the sheet, when in position between said parts of the feed mechanism is normally held away from the die and is pressed against the die by the punch when the latter moves to the die, operator-controlled means for changing the relation between the parts of the feed mechanism at the two sides of the sheet plane for changing the direction of feed of said mechanism, and automatic means for actuating said feed mechanism for feeding the sheet in the sheet plane, substantially as described.

19. In a machine for punching sheet-form material, a rotatable die block at one side of the sheet plane, means for imparting a step-by-step rotation to said block, a die on said block adjacent the sheet plane, feeding means adjacent said die, a yielding support tending to move said feeding means into the sheet plane, feed means at the opposite side of the sheet plane, yielding means tending to press said feed means into the sheet plane with less force than is exerted by the yielding means which tends to press the feed means at the opposite side of the sheet plane into the sheet plane, whereby the sheet is normally held away from the die, and a reciprocatory punch in alinement with said die, substantially as described.

20. In a machine for punching sheet-form material, the combination of a die and a reciprocatory punch located at opposite sides of a sheet plane, a feed ring surrounding the die, a support for said die, means for guiding said support for movement toward and from the sheet plane and limiting said movement in the direction of said sheet plane, a spring pressing said support toward said plane, means for imparting a step-by-step rotation of said support on the axis of the die, feed means on the opposite sides of the sheet plane, and yielding means applied to said feed means to press said means toward the sheet plane with less force than is exerted by the means which tends to press the feed ring support into the sheet plane, substantially as described.

21. In a machine for punching sheet-form material, a rotatable die block at one side of the sheet plane, means for imparting a step-by-step rotation to said block, a die on said block adjacent the sheet plane, feeding means adjacent said die, a yielding support tending to move said feeding means into the sheet plane, means for limiting the movement of said support toward the sheet plane, feed means at the opposite side of the sheet plane, yielding means tending to press said feed means into the sheet plane with less force than is exerted by the yielding means which tends to press the feed means at the opposite side of the sheet plane into the sheet plane, and a reciprocatory punch in alinement with said die, substantially as described.

22. In a machine for punching sheet-form material, the combination of a die and a reciprocatory punch located at opposite sides of a sheet plane, a feed ring surrounding the die, a support for said die, means for guiding said support for movement toward and from the sheet plane and limiting said movement in the direction of said plane, a spring pressing said support toward said plane, means for imparting a step-by-step rotation of said support on the axis of the die, feed means on the opposite sides of the sheet plane, yielding means applied to said feed means to press said means toward the sheet plane with less force than is exerted by the means which tends to press the feed ring support into the sheet plane, and operator-controlled means for moving the feed means at the punch side of the sheet plane into new positions in an orbital path surrounding the die axis for changing the direction of the feed of the sheet in the sheet plane, substantially as described.

23. In a machine for punching sheet-form material, the combination of a die located at one side of the sheet plane, a reciprocatory punch located at the other side of the sheet plane in alinement with the die, sheet feeding means located adjacent the die and at the same side of the sheet plane and adapted to bear against the sheet in the sheet plane, automatic means for giving said sheet feeding means a step-by-step movement for feeding said sheet parallel to the sheet plane, two presser members located at the other side of the sheet plane in position to resist movement of the sheet beyond its normal position when the punch is being drawn out of the sheet, substantially as described.

24. In a machine for punching sheet-form material, the combination of a die located at one side of the sheet plane, a reciprocatory punch located at the other side of the sheet plane in alinement with the die, sheet feeding means located adjacent the die and at the same side of the sheet plane and adapted to bear against a sheet in the sheet plane, automatic means for giving said sheet feeding means a step-by-step movement for feeding said sheet parallel to the sheet plane, two yielding presser members located at the other side of the sheet plane and at opposite sides of the punch in position to resist movement of the sheet beyond its normal position when the punch is being drawn out of the sheet, substantially as described.

25. In a machine for punching sheet-form material, the combination of a die located at one side of the sheet plane, a reciprocatory punch located at the other side of the sheet plane in alinement with the die, sheet feeding means located adjacent the die and at the same side of the sheet plane and adapted to bear against a sheet in the sheet plane, automatic means for giving said sheet feeding means a step-by-step movement for feeding said sheet parallel to the sheet plane, two yielding presser members located at the other side of the sheet plane and at opposite sides of the punch in position to resist movement of the sheet beyond its normal position when the punch is being drawn out of the sheet, one of said presser members being in operative relation with the punch actuating mechanism to move said member toward the sheet plane when the punch moves toward said plane, substantially as described.

26. In a machine for punching sheet-form material, a die located at one side of the sheet plane, a reciprocatory punch located at the other side of the sheet plane in alinement with the die, sheet feeding means, automatic means for imparting to said feeding means a step-by-step motion, mechanism for reciprocating the punch, and presser means in operative relation with the punch-actuating means for driving said presser means toward the sheet plane when the punch moves toward the sheet plane and holding said presser means adjacent the sheet plane until the punch actuating mechanism has traversed a chosen distance in the return part of its path, substantially as described.

27. In a machine for punching sheet-form material, a die located at one side of the sheet plane, a reciprocatory punch located at the other side of the sheet plane in alinement with the die, sheet feeding means, automatic means for imparting to said feeding means a step-by-step motion, mechanism for reciprocating the punch, and presser means comprising two reciprocatory members and two springs and being in operative relation with the punch actuating means for driving said presser means toward the sheet plane when the punch moves toward the sheet plane and holding said presser means adjacent the sheet plane until the punch actuating mechanism has traversed a chosen distance in the return part of its path, substantially as described.

28. In a machine for punching sheet-form material, a die located below the sheet plane, a reciprocatory punch located above the sheet plane in alinement with the die, a downward-yielding sheet-feeding ring located below the sheet plane and having an upper face approximately parallel to the sheet plane and adapted to engage a sheet which is in the sheet plane and to move in a path which is concentric to the die, means for turning said feeding ring step-by-step, and presser means located above the sheet plane and adapted to bear upon the upper face of said sheet in opposition to a part of said ring and to move in unison with the ring for the shifting of the sheet, substantially as described.

29. In a machine for punching sheet-form material, a die located below the sheet plane, a reciprocatory punch located above the sheet plane in alinement with the die, a downward-yielding sheet-feeding ring located below the sheet plane and having a crown approximately parallel to the sheet plane and adapted to engage a sheet which is in the sheet plane and to move in a path which is concentric to the die, means for turning said feeding ring step-by-step, and presser means located above the sheet plane and adapted to bear upon the upper face of said sheet in opposition to a part of said ring and to move in unison with the feed means for the shifting of the sheet, substantially as described.

30. In a machine for punching sheet-form material, a die located below the sheet plane, a reciprocatory punch located above the sheet plane in alinement with the die, downward yielding sheet feeding means located below the sheet plane and having its upper face normally above the level of the die and adapted to engage a sheet which is in the sheet plane and to move in a path which is concentric to the die, stop means for limiting the upward movement of the feeding means, means for moving said feeding means step-by-step in said path, and presser means located above the sheet plane and adapted to bear upon the upper face of said sheet in opposition to the lower feed means and to move in unison with the feed means for the shifting of the sheet, substantially as described.

31. In a machine for punching sheet-form material, a die located below the sheet plane, a reciprocatory punch located above the sheet plane in alinement with the die, a downward-yielding sheet feeding member located below the sheet plane and surrounding the die axis and having an upper face approximately parallel to the sheet plane and having its upper face normally above the level of the die and adapted to engage a sheet which is in the sheet plane and to move in a path which is concentric to the die, stop means for limiting the upward movement of the feeding means, means for moving said feeding means step-by-step in said path, and presser means located above the sheet plane and adapted to bear upon the upper face of said sheet in opposition to the lower feed means and to move in unison with the feed means for the shifting of the sheet, substantially as described.

32. In a machine for punching sheet-form material, a rotatable die support located below the sheet plane and having a discharge throat, a die on said support, a feed member surrounding said die and having an upper face approximately parallel to the sheet plane, a reciprocatory punch located above the sheet plane in alinement with the die, means for rotating said die support step-by-step, and presser means located above the sheet plane and adapted to bear upon the upper face of said sheet in opposition to a portion of said lower feed member and to move in unison with said feed member for the shifting of the sheet, substantially as described.

33. In a machine for punching sheet-form material, a rotatable die support located below the sheet plane and having a discharge throat, a die on said support, a feed member surrounding said die and having an upper face approximately parallel to the sheet plane, a reciprocatory punch located above the sheet plane in alinement with the die, means for rotating said die support step-by-step, a presser located above the sheet plane and adapted to bear upon the upper face of said sheet in opposition to a portion of the lower feed member, and operator controlled means for moving said presser in an orbital path which surrounds the die axis, substantially as described.

34. In a machine for punching sheet-form material, the combination of a die block, a passage extending up and down through said block, a die rigidly supported on said block, a base plate surrounding said die and supported by said block, a feed ring supported by said base plate concentric to the die axis, means for imparting a step-by-step rotation to said die block, a reciprocatory punch located above the sheet plane in alinement with the die, and presser means located above the sheet plane and adapted to bear upon the upper face of said sheet in opposition to a portion of the feed ring, substantially as described.

35. In a machine for punching sheet-form material, the combination of a rotary block having an upright bore and having around its base a bevel gear, a die supported by said die block, means comprising a bevel gear wheel for imparting to the bevel wheel of the die block a step-by-step rotation, a feed ring supported by said block concentric to the die axis and having an upper face approximately parallel to the sheet plane, a reciprocatory punch located above the sheet plane in alinement with the die, and presser means located above the sheet plane and adapted to bear upon the upper face of said sheet in opposition to a portion of the feed ring and to move in unison with the feed ring for the shifting of the sheet parallel to the sheet plane, substantially as described.

36. In a machine for punching sheet-form material, the combination of a rotary die support located below the sheet plane, a die on said support, a feed ring base plate, a feed ring located on said base plate and surrounding said die, a spring yieldingly supporting said base plate in position to bring the upper face of the feed ring a little above the level of the upper face of the die, means for imparting a step-by-step rotation to said support, and a presser and a punch located above the sheet plane, substantially as described.

37. In a machine for punching sheet-form material, the combination of a rotary die support located below the sheet plane, a die on said support, a feed ring base plate, a feed ring located on said base plate and surrounding the die, a spring yieldingly supporting said base plate in position to bring the upper face of the feed ring a little above the level of the upper face of the die, means for limiting the upward movement of the base plate, and a presser and a punch located above the sheet plane, substantially as described.

38. In a machine for punching sheet-form material, the combination of a rotary die support located below the sheet plane, a die on said support, a feed ring base plate, a feed ring located on said base plate and surrounding the die, a spring yieldingly supporting said base plate in position to bring the upper face of the feed ring a little above the level of the upper face of the die, screw posts for limiting the upward movement of the base plate, and a presser and a punch above the sheet plane, substantially as described.

39. In a machine for punching sheet-form material, the combination of a body having a throat and an upright neck having a discharge throat, a rotary die block mounted on said neck, a die on said block, a feed ring on said block concentric to the axis of the die, a reciprocatory punch above and in alinement with the die, automatic means for turning the die block step-by-step, a presser located above the die block and adapted to engage a sheet in opposition to a part of the feed ring, substantially as described.

40. In a machine for punching sheet-form material, the combination of an upright, tubular neck located below the sheet plane, a die support located for rotation on said neck and having a discharge throat registering with the opening in said neck, a die on said support, a feed ring on said support and surrounding the die, means for imparting a step-by-step rotation to said support, and a presser and a punch above the sheet plane, substantially as described.

41. In a machine of the nature described, the combination of a die located at one side of the sheet plane, feed means surrounding the die, automatic means for imparting a step-by-step motion to said feed means, a feed member and a reciprocatory punch located at the opposite side of the sheet plane, the punch being in alinement with the die and said feed member being positioned opposite a part of the feed means which is at the opposite side of the sheet plane, substantially as described.

42. In a machine of the nature described, the combination of a die located at one side of the sheet plane, feed means surrounding the die and yielding transversely to the sheet plane, automatic means for imparting a step-by-step motion to said feed means, a feed member and a reciprocatory punch located at the opposite side of the sheet plane, the punch being in alinement with the die and said feed member being positioned opposite a part of the feed means which is at the opposite side of the sheet plane, substantially as described.

43. In a machine of the nature described, the combination of a die located at one side of the sheet plane, feed means surrounding the die, automatic means for imparting a step-by-step motion to said feed means, a turret body at the opposite side of the sheet plane, a reciprocatory cutter in alinement with said die, and a feed member supported by said turret body in position to be carried around the die axis by the rotation of the turret body, and operator-controlled means for turning the turret body, substantially as described.

44. In a machine of the nature described, the combination of a die located at one side of the sheet plane, feed means surrounding the die, automatic means for imparting a step-by-step motion to said feed means, a turret body at the opposite side of the sheet plane, a reciprocatory cutter in alinement with said die and slidable in the turret body, and a feed member supported by said turret body in position to be carried around the die axis by the rotation of the turret body, and operator-controlled means for turning the turret body, substantially as described.

45. In a machine of the nature described, the combination of a die located at one side of the sheet plane, feed means surrounding the die, automatic means for imparting a step-by-step motion to said feed means, a turret body at the opposite side of the sheet plane, a reciprocatory cutter in alinement with said die and slidable in and rotatable with the turret body, and a feed member supported by said turret body in position to be carried around the die axis by the rotation of the turret body, and operator-controlled means for turning the turret body, substantially as described.

46. In a machine of the nature described, the combination of a die located at one side of the sheet plane, feed means surrounding the die, automatic means for imparting a step-by-step motion to said feed means, a feed member and a reciprocatory punch located at the opposite side of the sheet plane, means for moving said feed member in an orbital path surrounding the die axis and correspondingly turning the punch on said axis, substantially as described.

47. In a machine of the nature described, the combination of a die located at one side of the sheet plane, feed means surrounding the die, automatic means for imparting a step-by-step motion to said feed means, a turret body at the opposite side of the sheet plane, a punch engaged by said turret body to permit endwise sliding and to compel rotation of the punch with the turret body, and a reciprocatory coupling body engaging one end of the punch to compel endwise movement and permit rotation of the punch, substantially as described.

48. In a machine for punching sheet-form material, the combination of a rotary die support located below the sheet plane, a die on said support, a feed ring base plate, a feed ring located on said base plate and surrounding the die, yielding means supporting said base plate in position to bring the upper face of the feed ring a little above the level of the upper face of the die, screw posts for limiting the upward movement of the base plate, adjustable members in the paths of the lower end of said screw posts for limiting the downward movement of said posts, and a presser and a punch above the sheet plane, substantially as described.

In testimony whereof I have signed my name this 7th day of October, in the year one thousand nine hundred and eighteen.

CHARLES BAXTER GRAY.